Jan. 24, 1933.  E. A. DREW  1,895,028
WATER HEATER FOR STOCK
Filed Dec. 16, 1930  2 Sheets-Sheet 1
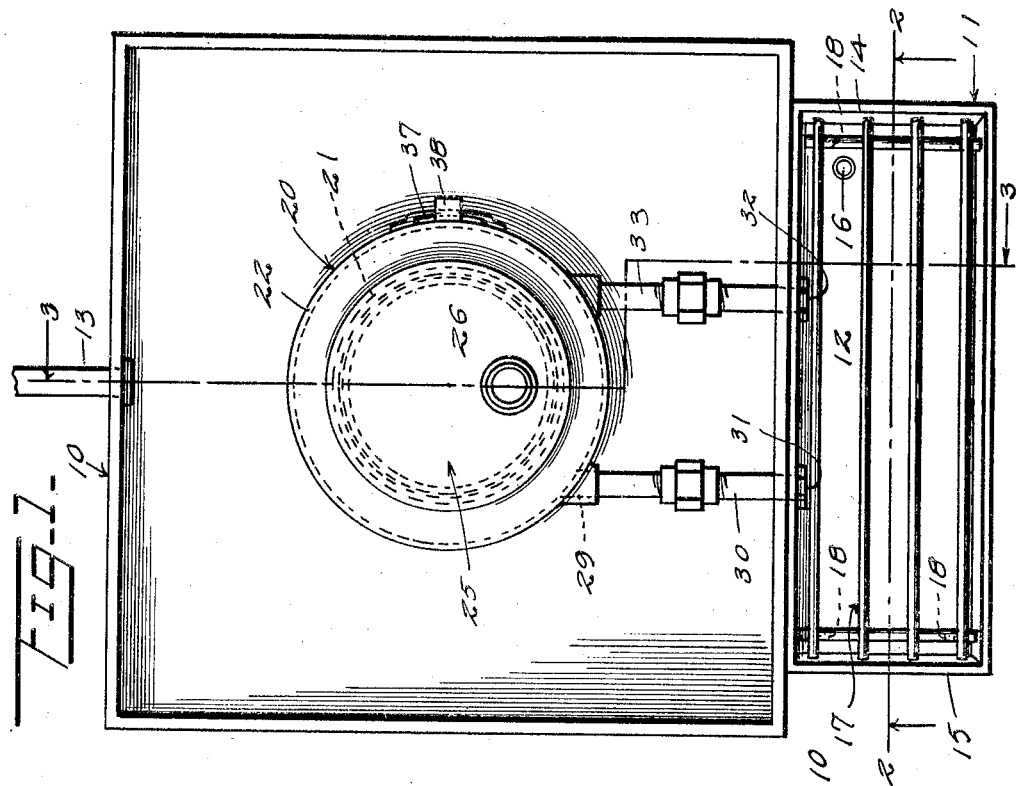
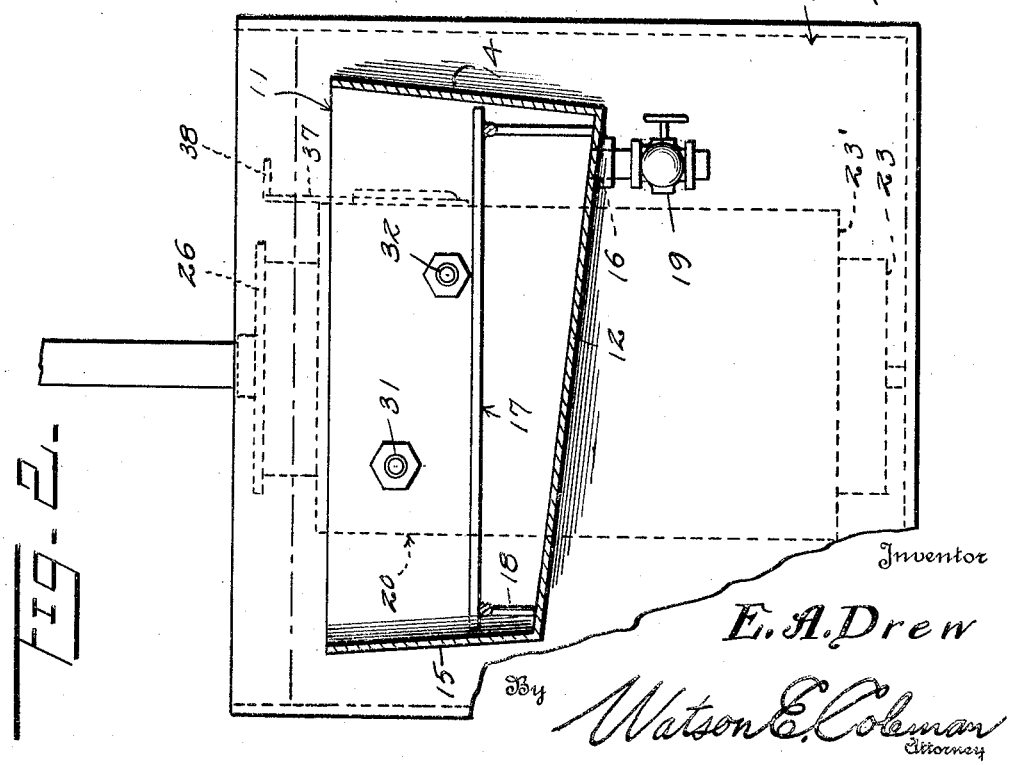
Inventor
E. A. Drew
By Watson E. Coleman
Attorney

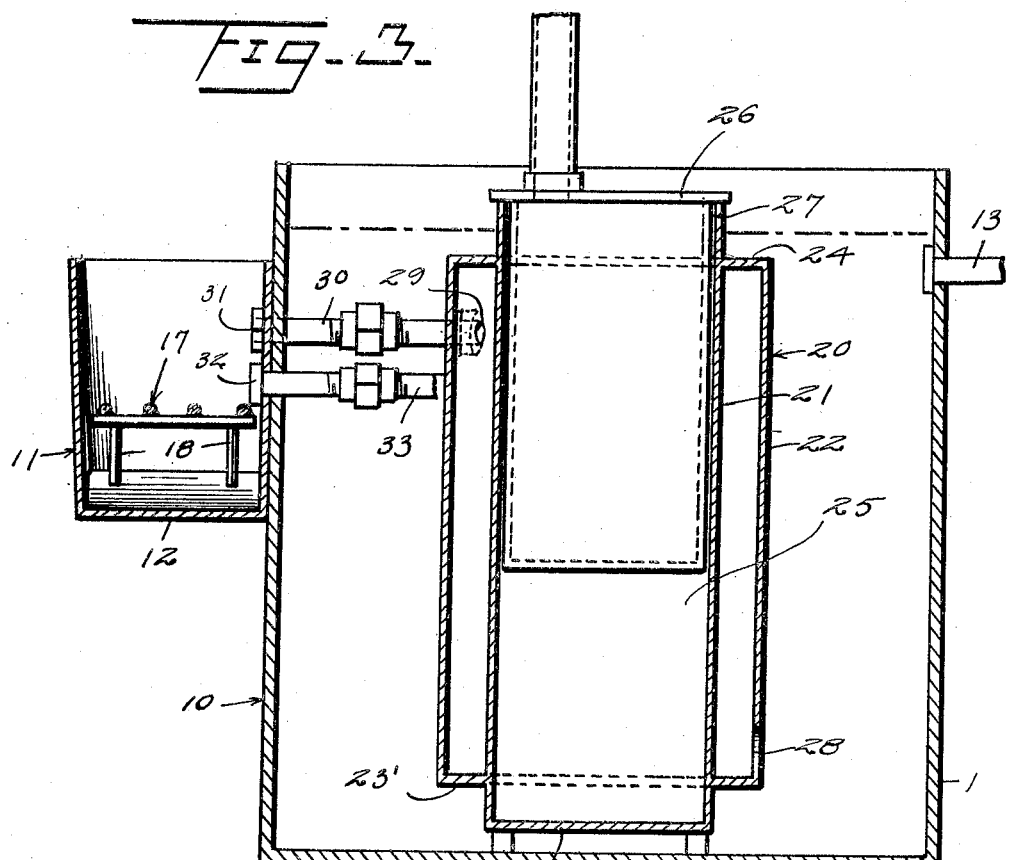
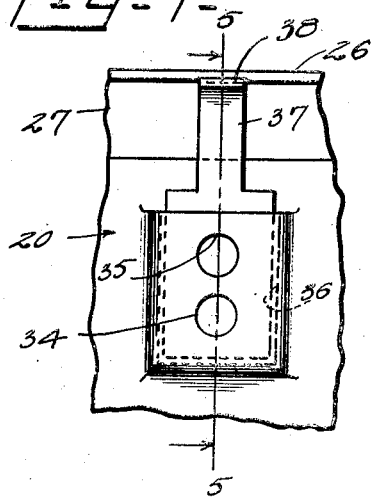
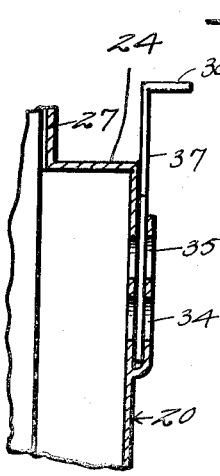

Patented Jan. 24, 1933

1,895,028

UNITED STATES PATENT OFFICE

EDWARD A. DREW, OF DELTA, IOWA

WATER HEATER FOR STOCK

Application filed December 16, 1930. Serial No. 502,781.

The present invention relates to drinking troughs for animals and more particularly to means for providing heated water in the trough.

An object of this invention is to provide a drinking trough in combination with a heating member whereby the water within the trough will be maintained in a relatively heated condition at all times so as to prevent freezing of the water.

Another object of this invention is to provide in means for heating water in a device of this kind means for by-passing the water within the heating unit when the water becomes unduly hot.

A further object of this invention is to provide a water heating member which may be readily submerged in a conventional reservoir or the like, the device being so constructed as to receive a conventional submerged heating stove or member.

A further object of this invention is to provide in a device of this kind means for preventing splitting or breaking of the exposed trough or troughs in the event the water accidently becomes frozen.

A still further object of this invention is to provide in a drinking trough means by which the sediment or the like may be readily removed from the drinking trough, the trough embodying means for preventing the animals from stirring up the sediment in the bottom of the trough.

The above and various other objects and advantages of this invention will in part be described in and in part be understood from the following detailed description of the present preferred embodiment, the same being illustrated in the accompanying drawings wherein:—

Figure 1 is a detail top plan view of a device constructed according to the preferred embodiment of this invention;

Figure 2 is a sectional view partly in detail taken on the line 2—2 of Figure 1;

Figure 3 is a sectional view taken on the line 3—3 of Figure 1;

Figure 4 is a fragmentary side elevation of the water heating member, and

Figure 5 is a fragmentary sectional view taken on the line 5—5 of Figure 4.

Referring to the drawings wherein like numerals of reference designate corresponding parts throughout the several views, the numeral 10 designates generally a tank or reservoir of any desired capacity which is connected to a suitable source of supply by means of a pipe line 13 which is adapted to maintain the water in the reservoir 10 at a predetermined level.

On the outer wall of the reservoir 10 there is positioned a drinking trough generally designated as 11 and if desired, each wall of the reservoir 10 may be provided with a similar trough. The inner wall of the trough 11 is secured to the reservoir 10 in any desired manner as by bolts or the like and the ends together with the outer wall of the trough 11 are preferably positioned in upwardly diverging relation so that in the event the water within the trough 11 becomes frozen, the walls of the trough will not become damaged through expansion of the frozen liquid. The bottom 12 of the trough 11 is inclined downwardly and one end 14 is substantially deeper than the opposite end 15. At the lowermost point or closely adjacent the end wall 14, there is provided a drain opening or outlet 16 so as to permit the sediment accumulating within the bottom 12 to be drained out of the trough 11.

A rack or grate generally designated as 17 is supported within the trough 11 by means of uprights 18 which removably engage the bottom 12 of the trough, this grate 17 being mounted in substantially horizontal relation within the trough 11 and in spaced relation to the bottom 12 so that when the animals are drinking from the trough 11, they will not disturb the sediment which settles into the bottom of the trough. The outlet 16 may be provided with a suitable valve or plug 19 so that when desired, the valve or plug 19 may be opened and the trough suitably cleaned.

A water circulating member or jacket generally designated as 20 is mounted within the reservoir or tank 10, this jacket 20 comprising an inner casing 21, an outer casing 22, a bottom plate 23 which closes the bottom of the inner casing 21 and a lower ring 23' which connects the inner and the outer members 21 and 22, respectively. A ring or top plate 24 engages the inner and the outer casings 21 and 22 so as to provide a relatively closed water jacket and a hollow shell or chamber 25 within which a heating member 26 is adapted to be positioned. This heating member 26 may be constructed in any desired form and is preferably of conventional construction, that is, a heater which is adapted to be practically submerged within the water positioned in the reservoir 10. The inner casing 21 preferably projects upwardly and above the top ring 24 as disclosed at 27 so that the entire heating jacket 20 may be submerged within the water in the reservoir 10. The outer casing or shell 22 is provided adjacent the bottom thereof with an inlet opening 28 which communicates with the interior of the tank 10 so that cold water within the tank may pass inwardly through this opening 28 and into the jacket 20.

Adjacent the upper end of the jacket 20 there is provided a hot or warm water outlet 29 which is connected by a suitable pipe connection 30 to an inlet opening 31 in the trough 11. In this manner, the heated water within the jacket 20 will pass around the heater 26 and upwardly therethrough and into the trough 11. An outlet opening 32 is provided in the trough 11 and a return conduit 33 is connected at one end to this outlet 32 and at the opposite end to the jacket 20 at a point below the horizontal plane of the outlet 29.

In this manner, when the heated water passes through the conduit 30 and into the trough 11, it will flow toward the outlet 32 and back into the jacket 20 through the return pipe line 33. This return pipe line 33 may be connected to the outer shell 22 at any desired point below the level of the outlet 29.

It will be obvious from the foregoing that any water disposed within the heating jacket 20 will circulate thereabout and becoming heated will rise toward the top thereof and flow outwardly through the outlet 29 and into the trough 11 by means of the conduit 30.

In the event the water within the jacket 20 becomes unduly heated, the water is adapted to be by-passed into the reservoir or tank 20 by means of by-pass outlets or ports 34 and 35. These ports 34 and 35 are positioned in the outer casing 22 adjacent the top thereof and are preferably spaced vertically, the outlet 34 being preferably coplanar with the outlet 29 and the outlet 35 being preferably disposed upwardly therefrom and adjacent the top of the outer casing 22.

A guide member 36 is secured to the outer casing 22 and is provided with complementary openings which register with the openings 34 and 35 in the outer casing 22 and a slidable closure 37 engages the guide 36 and when in lowermost position is adapted to close both of the openings 34 and 35. When the water becomes unduly heated within the jacket 20, the slide or closure member 37 may be pulled upwardly, thereby permitting the water within the jacket 20 to be by-passed into the tank or reservoir 10.

This outer casing 22 is preferably shorter in length than the inner casing 21 so that the inner casing 21 may, if desired, rest on the bottom of the tank 22 and the outer casing 22 will be disposed upwardly from the bottom of the tank 10. The closure member 37 may be provided with a reverted upper end 38 constituting a handle or means by which the closure plate may be readily moved upwardly into a position permitting the water within the jacket 20 to flow outwardly through the openings 34 and 35. By disposing the top of the jacket 20 below the normal surface of the water within the tank 10 in the event the surface of the water within the tank 10 should become frozen, the water within the jacket 20 will not become frozen so as to prevent the free circulation of the water to the trough 11.

In the use of this device, the heater 26 may be disposed within the inner casing 22 and when the water within the jacket 20 becomes sufficiently heated, the heated water will rise toward the top of the jacket 20 and flow outwardly thereof through the outlet 29 and the conduit 30 into the trough 11. The flow of water will then pass along the trough 11 toward the outlet 32 and back into the jacket 20 at a point below the level of the outlet 29 through the conduit 33. The jacket 20 will be maintained in filled condition at all times through the inlet opening 28 which communicates with the interior of the tank 10.

It is, of course, understood that various changes and modifications may be made in the details of construction and design of the above specifically described embodiment of this invention without departing from the spirit thereof, such changes and modifications being restricted only by the scope of the following claims.

I claim:—

1. In combination, a water reservoir, a trough disposed exteriorly of the reservoir, a chambered member mounted within the reservoir and having an opening communicating with the interior of the reservoir, conduits connecting the member with the trough, and a heater disposed in said member for heating the water therein whereby to cause the circulation of water in said trough member.

2. In combination, a water reservoir, a trough disposed exteriorly of the reservoir, a chambered member mounted within the reservoir and having an inlet opening adjacent the bottom thereof communicating with the interior of the reservoir, an outlet adjacent the upper end of said member, a conduit connecting the outlet with the trough, and a return conduit connecting the trough with the member at a point below the horizontal plane of said outlet.

3. In combination, a water reservoir, a trough secured to the reservoir, said trough having the walls thereof mounted in divergent relation, a water heating member disposed within the reservoir, means for providing a continuous flow of water from the reservoir through the heating member to the trough, and means for returning the heated water from the member to the reservoir.

4. In combination, a water reservoir, a trough secured to the reservoir exteriorly thereof, said trough having a longitudinally and downwardly inclined bottom, a horizontally disposed grate mounted within the trough, a water heating member mounted within the reservoir, said water heating member having an inlet opening adjacent the bottom thereof and an outlet adjacent the top communicating with the reservoir, means connecting the member and the trough whereby to provide a flow of water from the member to the trough and slidable closure means for said outlet carried by the member whereby to control return of the water to the reservoir.

5. In combination, a water reservoir, a trough, a chambered member disposed within the reservoir, said member having an upwardly disposed extension at the upper end thereof to support a heating unit in depending relation in said member, said member also having an inlet at the bottom thereof, an outlet secured to said member adjacent the upper end thereof, means connecting the outlet with the trough, a return conduit connecting the trough with the member, and a heater supported within the member.

6. In combination, a water reservoir, a trough, and a chambered water heating member connected to the trough and disposed within the reservoir, said member having an inlet communicating with the interior of the reservoir, said member also having an outlet adjacent the upper end thereof communicating with said trough, a guide secured to the outer wall of said member, and a slidable closure engaging the guide and controlling the flow of water through said outlet.

In testimony whereof I hereunto affix my signature.

EDWARD A. DREW.